Patented June 4, 1946

2,401,543

UNITED STATES PATENT OFFICE 2,401,543

PRODUCTION OF TITANIUM TETRACHLORIDE

Paul S. Brallier, Niagara Falls, N. Y., assignor to Stauffer Chemical Company, a corporation of California No Drawing. Application June 24, 1943, Serial No. 492,125

3 Claims. (Cl. 23—87)

This invention relates to the production of titanium tetrachloride by chlorination of titanium oxide.

Titanium tetrachloride has heretofore been produced by chlorination of titanium carbide and the complex, titanium cyanonitride. These materials are produced by electric furnace operations. Their production involves the use of power, electric furnace capacity and high temperatures; these are necessarily reflected in their high final cost.

When one attempts to form titanium tetrachloride from titanium oxide by chlorination in the presence of a reducing agent such as carbon or carbon monoxide, several difficulties are now encountered. First, it is necessary to supply heat from an external source. Second, the reaction must be carried out in equipment which is inert to the action of chlorine and titanium chloride vapors in a temperature range between about 700° and 1000° C.

While the reaction

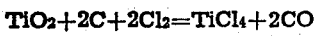

$$TiO_2 + 2C + 2Cl_2 = TiCl_4 + 2CO$$

is slightly exothermic and would go apparently on continuously simply by adding chlorine gas and fresh titanium oxide-reducing agent mixture to the reaction zone, this is not feasible because of heat losses from the furnace in carrying out the process on a practical and commercial scale. Also, withdrawal of the reaction products from the zone is usually affected at a temperature of about 400° C. The heat thus withdrawn is more than the heat developed by formation of titanium tetrachloride and carbon monoxide from the oxide and carbon. The net effect of this, therefore, is that to maintain the reaction, heat must be supplied to the reaction zone from an external source. The special construction materials which will not be attacked by chlorine and titanium tetrachloride vapors at the elevated temperatures, make heat supply to the reaction zone very difficult if not impractical.

I have found that it is possible to develop supplemental heat within the reaction zone by chlorinating materials which supply additional titanium tetrachloride. For example, by including titanium carbide or titanium cyanonitride in the reaction zone in a sufficient amount it is possible to carry on the reaction, forming titanium tetrachloride continuously, without external heating of the reaction zone. I have successfully included titanium carbide or titanium cyanonitride or both in the furnace during reduction-chlorination of the titanium oxide. These, when introduced into the reaction zone and chlorinated, form titanium tetrachloride and evolve sufficient heat to enable the reaction to be continued.

The quantity of titanium carbide or titanium cyanonitride to be included depends upon two factors, (a) the temperatures at which the products of reaction are removed from the chlorinator and (b) the heat loss from the chlorinator. For example, in forming one pound of titanum tetrachloride from titanium cyanonitride 1125 B. t. u. of heat are liberated. In the formation of one pound of titanium tetrachloride by the chlorination of a mixture of titanium oxide and carbon, 462 B. t. u. are absorbed. These values are based upon the assumption that the reaction products are withdrawn at a temperature of 400° C. and that no heat loss occurs in the chlorinator. On this basis, 2.43 pounds of titanium tetrachloride can be evolved from a titanium oxide-carbon mixture from the heat evolved upon simultaneous production of one pound of titanium tetrachloride from titanium cyanonitride. Stated in other terms, the heat evolved upon production of a pound of titanium tetrachloride from titanium cyanonitride will suffice for the formation of 2.43 pounds of titanium tetrachloride from a stoichiometric mixture of titanium oxide and carbon weighing 1.35 pounds.

Since heat losses are unavoidable, this ratio cannot be obtained in practice and I therefore employ more than the theoretical quantity of titanium cyanonitride or titanium carbide. The upper limit of the titanium carbide and titanium cyanonitride is that point whereat so much heat is liberated that its removal from the clorinator becomes a problem and cooling of some type must be practiced. Usually about 0.65 pound of titanium cyanonitride suffice per pound of oxide with carbon as a reducing agent. If only carbon monoxide is used, less than about 0.25 pound suffices. Titanium carbide can be substituted on the basis of about 117 pounds in place of 100 pounds of the cyanonitride.

It is not essential to practice of the invention that the titanium carbide and titanium cyanonitride be actually incorporated in the titanium oxide-carbon mixture and we have successfully operated by adding to the furnace a mixture consisting of briquets of the titanium oxide-carbon mixture and lumps of the titanium carbide or titanium cyanonitride of a size approximately equal to that of the briquets.

In place of titanium oxide one can use any other material containing an appreciable percentage of the oxide such as rutile, ilmenite and ferrotitanates. When the material contains other constituents as iron or aluinum, separation of the several halides will be necessary.

Carbon, carbon monoxide or other carbonaceous reducing agent can be employed while chlorine and materials supplying chlorine can be used for the chlorine source. These other materials include phosgene, carbon tetrachloride, other chlorinated hydrocarbons or other gaseous chlorinating agents. They can be used in conjunction with or in lieu of chlorine.

The practice of the invention will be made further apparent upon considering the following example:

A shaft furnace was preheated by burning coke in the furnace until it was up to temperature. A furnace charge, consisting of titanium oxide-carbon briquets and pieces of titanium cyanonitride, was fed in on top of the burning coke to bring the charge up to temperature. Chlorine was introduced at the base of the furnace, passing counter-current to the charge. The briquets fed contained 71.4% titanium dioxide to 28.6% carbon. They were fed in a ratio of one pound of briquet to 1.33 pounds of titanium cyanonitride. The furnace employed was not designed for heat retention and this ratio can be improved and even reversed if a better design of furnace is adopted. Over a period of a month's continuous operation, practically all titanium entering the furnace was evolved as the tetrachloride and this without any necessity for supplying additional heat to the operation.

I claim:

1. A continuous process for formation of titanium tetrachloride from a titanium oxide comprising chlorinating a mixture of titanium oxide and a material selected from the group consisting of titanium carbide and titanium cyanonitride in the presence of a reducing agent, the quantity of the material and the reducing agent being sufficient to maintain by the heat generated by the reaction a temperature of at least 600° C., and in a reaction medium containing no other reactants therewith having any material exothermic effect.

2. A continuous process for formation of titanium tetrachloride in a shaft furnace comprising feeding titanium oxide into said furnace, feeding a material selected from the group consisting of titanium carbide and titanium cyanonitride into said furnace, adding a reducing agent for said oxide to said furnace, introducing chlorine into said furnace sufficient substantially to chlorinate all titanium in said oxide and in said material to the tetrachloride, the quantity of the material and the reducing agent being sufficient to maintain by the reaction a temperature of at least 600° C. and in a reaction medium containing no other exothermic reactants therewith having any material exothermic effect.

3. A continuous process for formation of titanium tetrachloride comprising preheating a reaction zone to a temperature conducive to the formation of $TiCl_4$; continuously introducing $TiO_2$ and a material selected from the group consisting of TiC and TiCn; continuously introducing a reducing agent in a quantity only sufficent for reduction of the $TiO_2$ to titanium for chlorination in said reaction zone; continuously introducing chlorine to chlorinate substantially all titanium in said $TiO_2$ and in said material to $TiCl_4$; the quantity introduced of said material and of said reducing agent being sufficient, after initial preheating of the reaction zone, to maintain said zone at said temperature by the heat generated by the reaction and in a reaction medium containing no other reactants therewith having any material exothermic effect.

PAUL S. BRALLIER.